(12) United States Patent
Griffin et al.

(10) Patent No.: US 7,881,743 B2
(45) Date of Patent: Feb. 1, 2011

(54) HANDHELD MOBILE COMMUNICATION DEVICE

(75) Inventors: Jason T. Griffin, Waterloo (CA); Norman M. Ladouceur, Waterloo (CA)

(73) Assignee: Research In Motion Limited, Waterloo (CA)

( * ) Notice: Subject to any disclaimer, the term of this patent is extended or adjusted under 35 U.S.C. 154(b) by 2120 days.

(21) Appl. No.: 10/271,917

(22) Filed: Oct. 16, 2002

(65) Prior Publication Data

US 2003/0073456 A1 Apr. 17, 2003

Related U.S. Application Data

(60) Provisional application No. 60/329,319, filed on Oct. 16, 2001.

(51) Int. Cl.
*H04M 1/00* (2006.01)
(52) U.S. Cl. .............. 455/550.1; 455/575.3; 455/566; 455/575.8
(58) Field of Classification Search .............. 455/550.1, 455/553.1, 566, 575.8, 575.4, 575.3
See application file for complete search history.

(56) References Cited

U.S. PATENT DOCUMENTS

| | | | |
|---|---|---|---|
| D278,341 S | 4/1985 | Scheid | |
| D293,241 S | 12/1987 | Wan et al. | |
| D312,628 S | 12/1990 | Yokoi et al. | |
| D313,401 S | 1/1991 | Tanabe | |
| D313,413 S | 1/1991 | Langton | |
| 5,184,830 A | 2/1993 | Okada et al. | |
| 5,217,295 A | 6/1993 | Tortola et al. | |
| 5,295,089 A * | 3/1994 | Ambasz .................. | 361/679.09 |
| 5,367,298 A | 11/1994 | Axthelm | |
| D357,253 S | 4/1995 | Wong | |
| 5,410,141 A | 4/1995 | Koenck et al. | |
| 5,426,449 A | 6/1995 | Danziger | |
| D359,920 S | 7/1995 | Sakamoto | |
| 5,436,954 A | 7/1995 | Nishiyama et al. | |
| 5,457,454 A | 10/1995 | Sugano | |
| 5,500,643 A | 3/1996 | Grant | |
| 5,606,712 A | 2/1997 | Hidaka | |
| 5,611,031 A | 3/1997 | Hertzfeld et al. | |

(Continued)

FOREIGN PATENT DOCUMENTS

EP 0760291 3/1997

(Continued)

OTHER PUBLICATIONS

JP2001-154990 Hayashida, Aug. 6, 2001, Cradle, Japan.*

(Continued)

*Primary Examiner*—Nghi H Ly
(74) *Attorney, Agent, or Firm*—Jones Day; Krishna K. Pathiyal; Robert C. Liang

(57) ABSTRACT

A digital communications device with a reduced size, enhanced keyboard and large screen is disclosed. The mobile device has an auxiliary input such as a keyboard with a plurality of keys that is arranged in a first position to minimize the size of the device, and in a second position to enable the use of the auxiliary input in conjunction with other auxiliary inputs and the display. When in the first position, the keyboard is used to make telephone inputs and when in the second position, the keyboard is used to make textual inputs.

16 Claims, 6 Drawing Sheets

U.S. PATENT DOCUMENTS

| | | | |
|---|---|---|---|
| D381,021 S | 7/1997 | Williams et al. | |
| D383,756 S | 9/1997 | Henderson et al. | |
| 5,666,694 A * | 9/1997 | Slow et al. | 16/368 |
| 5,672,108 A | 9/1997 | Lam et al. | |
| D386,497 S | 11/1997 | Huslig et al. | |
| D390,509 S | 2/1998 | Antzinas et al. | |
| 5,737,394 A | 4/1998 | Anderson et al. | |
| D397,369 S | 8/1998 | Rissman | |
| D397,728 S | 9/1998 | Yuen et al. | |
| D399,537 S | 10/1998 | Chi et al. | |
| 5,818,437 A | 10/1998 | Grover et al. | |
| 5,825,353 A | 10/1998 | Will | |
| D402,572 S | 12/1998 | Han | |
| D403,362 S | 12/1998 | Fai | |
| 5,893,798 A | 4/1999 | Stambolic et al. | |
| 5,915,228 A | 6/1999 | Kunihiro et al. | |
| 5,920,308 A | 7/1999 | Kim | |
| 5,931,873 A | 8/1999 | Cisar | |
| 5,963,197 A | 10/1999 | Bacon et al. | |
| 5,974,238 A | 10/1999 | Chase, Jr. | |
| 5,982,520 A | 11/1999 | Weiser et al. | |
| 5,983,073 A * | 11/1999 | Ditzik | 455/11.1 |
| 5,995,026 A | 11/1999 | Sellers | |
| 6,005,927 A * | 12/1999 | Rahrer et al. | 379/142.01 |
| 6,006,351 A | 12/1999 | Peretz et al. | |
| 6,014,429 A | 1/2000 | LaPorta et al. | |
| D420,351 S | 2/2000 | Waldner | |
| 6,023,779 A | 2/2000 | Fullam et al. | |
| 6,047,047 A | 4/2000 | Aldridge et al. | |
| 6,052,070 A | 4/2000 | Kivela et al. | |
| 6,094,197 A | 7/2000 | Buxton et al. | |
| 6,102,594 A | 8/2000 | Strom | |
| 6,103,979 A | 8/2000 | Motoyama et al. | |
| 6,107,997 A | 8/2000 | Ure | |
| D432,511 S | 10/2000 | Eckholm | |
| D433,017 S | 10/2000 | Martinez | |
| 6,148,261 A | 11/2000 | Obradovich et al. | |
| 6,157,323 A | 12/2000 | Tso et al. | |
| D436,591 S | 1/2001 | Abston et al. | |
| 6,212,412 B1 | 4/2001 | Rogers et al. | |
| D441,733 S | 5/2001 | Do et al. | |
| 6,243,789 B1 | 6/2001 | Hasbun et al. | |
| 6,246,862 B1 * | 6/2001 | Grivas et al. | 455/566 |
| 6,249,672 B1 * | 6/2001 | Castiel | 455/575.4 |
| 6,259,932 B1 * | 7/2001 | Constien | 455/556.1 |
| 6,297,795 B1 | 10/2001 | Kato et al. | |
| D451,079 S | 11/2001 | Ali | |
| D454,349 S | 3/2002 | Makidera et al. | |
| D454,849 S | 3/2002 | Eckholm | |
| 6,374,304 B1 * | 4/2002 | Chiashi | 709/246 |
| D456,794 S | 5/2002 | Laverick et al. | |
| 6,397,078 B1 * | 5/2002 | Kim | 455/556.2 |
| D458,239 S | 6/2002 | Shim et al. | |
| D459,327 S | 6/2002 | Ali | |
| D460,068 S | 7/2002 | Lanzaro et al. | |
| 6,492,974 B1 * | 12/2002 | Nobuchi et al. | 345/156 |
| 6,549,789 B1 * | 4/2003 | Kfoury | 455/550.1 |
| 6,587,700 B1 * | 7/2003 | Meins et al. | 455/575.8 |
| 6,661,404 B1 * | 12/2003 | Sirola et al. | 345/168 |
| 6,681,125 B1 * | 1/2004 | Woo | 455/556.1 |
| 6,748,249 B1 * | 6/2004 | Eromaki et al. | 455/575.4 |
| 6,751,481 B2 * | 6/2004 | Chen et al. | 455/564 |
| 6,813,146 B2 * | 11/2004 | Haraguchi et al. | 361/681 |
| 6,825,832 B2 * | 11/2004 | Chung et al. | 345/168 |
| 6,980,840 B2 * | 12/2005 | Kim et al. | 455/575.4 |
| 7,054,440 B2 * | 5/2006 | Swerup et al. | 379/433.06 |
| 7,103,380 B1 * | 9/2006 | Ditzik | 455/556.2 |
| 2003/0073414 A1 * | 4/2003 | Capps | 455/90 |

FOREIGN PATENT DOCUMENTS

| | | |
|---|---|---|
| EP | 0 944 219 A2 | 9/1999 |
| GB | 2 359 963 A | 9/2001 |
| JP | 08-202473 | 8/1996 |
| JP | 11-331332 | 11/1999 |
| JP | 2001-119467 | 4/2001 |
| JP | 2001203792 A * | 7/2001 |
| JP | 2002171324 A * | 6/2002 |
| WO | 9937025 | 7/1999 |
| WO | 0030381 | 5/2000 |

OTHER PUBLICATIONS

JP08-202473 Kobori, Sep. 8, 1996, Electronic Equipment, Japan.*
"Programmable Calculators: Hewlett-Packard HP-200LX," Viktor T. Toth, copyr. 2001, 2002, from web page at www.rskey.org/hp200lx.htm.
Certified Translation into English, dated Sep. 27, 2007, of Japanese Patent Application No. JP2001-154990 to Hayashida, and certification cover sheet.
CIPO: Office Action issued Feb. 26, 2009 for Canadian Patent Application No. 2,638,752 (4 pages).

* cited by examiner

HANDHELD MOBILE COMMUNICATION DEVICE

CROSS-REFERENCE TO RELATED APPLICATION

This application claims the benefit of priority from U.S. Provisional Application No. 60/329,319, filed on Oct. 16, 2001.

FIELD OF THE INVENTION

This invention relates generally to the field of handheld mobile communication devices with display such as an LCD screen and a plurality of auxiliary inputs typically including a keyboard.

BACKGROUND OF THE INVENTION

Handheld mobile communication device (hereinafter referred to as mobile device or device) design is the subject to two competing interests. Users of these mobile devices have shown a distinct preference for smaller devices, which has driven the industry to attempt to reduce the size of a typical mobile device. Users have also shown a preference for mobile devices that offer many services in addition to standard voice telephony based services. These services tend to be data driven, and include short messaging service (SMS) based messaging, General Packet Radio Service (GPRS) data services, and 1X Code Division Multiple Access (CDMA) based data services. These services are inconvenient to use on a standard mobile device, as requesting or creating data through text entry on a standard device keypad is difficult, and viewing the received data is inconvenient on the small screens of conventional mobile devices. Thus users are demanding both smaller devices and devices with larger screens and more intuitive input devices than conventional mobile devices.

It should be noted that in the following description references are made to keypads and keyboards being auxiliary inputs.

Mobile devices tend to become larger and bulkier with the addition of auxiliary inputs such as keyboards and larger displays. However, the addition of such auxiliary inputs provides distinct usability advantages for handling and creating SMS messages and other data services. For this reason, auxiliary inputs are desirable. As a result, solutions have been offered that attempt to satisfy both the desire for larger screens and input devices and the desire for a smaller form factor for the device. One solution to this problem provides detachable keyboards that can be removed from the mobile device when they are not needed. These keyboards can connect to the mobile device using either a wireless or a wired link. Typically the wireless connections are achieved through either infrared or Bluetooth™ communications channels. These additional keyboards are not an ideal solution, as they require the user to carry an additional piece of equipment, which can be easily lost or misplaced.

To provide smaller mobile devices, several manufacturers provide clamshell mobile devices that have open and closed positions. In the closed position, the devices are compact, and protect both the screen and the keypad from inadvertent contact, while in an open position these devices provide access to the keypad and a display and allow the user to talk with another party. Clamshell devices require a second display if the user wishes to view information about incoming calls while the device is closed. Additionally these devices do not tend to offer auxiliary inputs that are suited to data entry.

Due to the demand for smaller devices, screens and keypad must either be miniaturised or repositioned to reduce device size. It is, therefore, desirable to provide a device with a small form factor, whose reduced size does not impair the usability of the screen or the input.

SUMMARY OF THE INVENTION

In one aspect of the invention, the mobile device has an auxiliary input such as a keyboard with a plurality of keys that is arranged in a first position to minimize the size of the device, and in a second position to enable the use of the auxiliary input in conjunction with other auxiliary inputs and the display. When in the first position, the keyboard is used for dialling telephone numbers.

In a further aspect of the present invention, there is provided a handheld mobile communication device for transmitting and receiving data. The device comprises first housing having a display and a second housing an auxiliary input. The display is for displaying information, and in various embodiments is either an LCD display or an LCD touchscreen. The auxiliary input is for inputting data. The second housing is movable in relation to the first housing between a closed position and an open position. In the closed position, the auxiliary input is situated behind the display and used for making telephone inputs. In the open position, the auxiliary input and the display are positioned to allow simultaneous viewing and text input.

In an embodiment of the first aspect of the present invention the second housing includes a hinge, which is optionally laterally rotatable, for hingedly attaching the first and second housings. In an embodiment where the hinge is not rotatable, the auxiliary input and the display face in opposing directions while in the closed position. In another embodiment, where the hinge is rotatable, the auxiliary input is inaccessible for receiving input in the closed position. In another embodiment, the second housing is slidably attached to the first housing, and the auxiliary input is inaccessible for receiving input while in the closed position. In another embodiment of the present invention, the second housing is held flush to the back of the first housing, in a recess, when in the closed position. In a further embodiment, while in the open position, the auxiliary input and the display substantially reside in the same plane. In a presently preferred embodiment, the auxiliary input device is a keyboard.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a device with an enhanced or auxiliary input and a display that is large in relation to the size of the device.

To overcome the competing interests associated with making devices smaller while offering auxiliary inputs for data entry, the present invention provides an auxiliary input that is attached to the display in a manner that allows it to be deployed in open and closed positions. In the closed position, the auxiliary input is held behind the display, and is then either rotated or slid into a working position that allows simultaneous viewing and operation. As will be described below, in a first embodiment, the auxiliary input provides a keyboard that can be simply rotated about a hinge into the open position from a closed position where it faces the opposing direction of the display. In this embodiment, the keys can be accessed for dialling a telephone or other simple tasks, without rotating the keyboard into the open position. In the open position, the keyboard is used for inputting text for SMS messaging, e-mail or other textual inputs.

FIGS. 1-4 illustrate one embodiment of the device with a keyboard 16 shown in a first position. The device 2 has a housing in two parts consisting of a first housing 4 and a second housing 4A, which are connected together by a hinge 14. The second housing 4A supports an auxiliary device, such as keyboard 16. In this first position of the keyboard, the device size is minimized.

Figure 1:
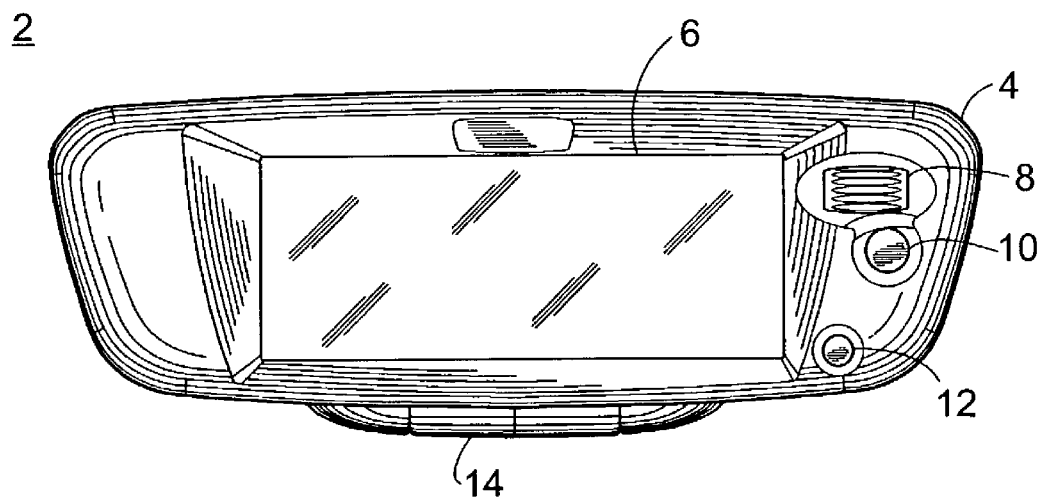
FIG. 1 is a front view of the device according to a first embodiment of the invention, with the keyboard in the first position.

Referring to FIG. 1, the first, or main, housing 4 includes, on its front side, a centrally located display 6, such as an LCD for displaying device output. An optional auxiliary input, such as a thumbwheel 8, can be located in close proximity to the display 6 for enabling inputs to be made while the user is viewing information on the display 6, regardless of the keyboard position. Other optional auxiliary inputs, such as keys or buttons 10, 12, may conveniently be located in proximity to display 6. Buttons 10, 12 may have functional purposes; for instance, button 10 close to the thumbwheel 8 may be associated with a 'cancel' action in an application and button 12 may be used to activate a backlight to illuminate display 6.

Figure 2:
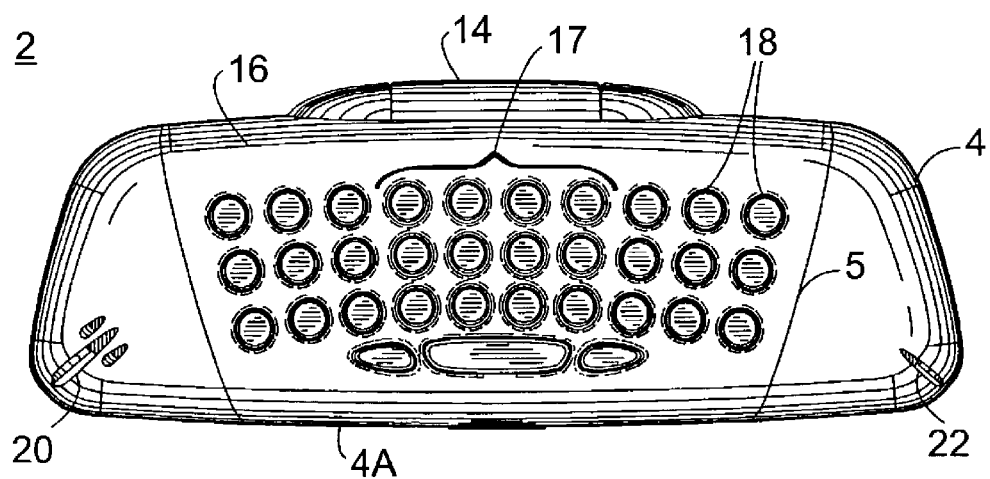
FIG. 2 is a back view of the device of FIG. 1 with the keyboard in the first position.

FIG. 2 shows the rear of the device with the keyboard 16 in the first position, also referred to as the closed position. In this closed position, the second housing 4A nests in a recess 5 in the rear of the first housing 4 and sits flush with the plane of the first housing 4 with the keyboard 16 facing outwards and accessible to a user. In the illustrated embodiment, individual keys 18 of the keyboard 16 are organized to form a QWERTY or a DVORAK keyboard. In this first position, the highlighted keys 17 may be used as a telephone ITU E 1.161 Standard Key PadAn ITU E 1.161 Standard Key Pad typically has a 3×4 layout of keys. Therefore, the highlighted keys 17 are preferably used in a 90-degree rotation from the layout of the QWERTY keyboard 16, which has a 10×3 layout of keys. These keys 17 may be highlighted with different colors on or around the keys or by marking the numbers of an ITU E 1.161 Standard Key Pad adjacent to each key. Alternatively, the highlighted keys 17 may be differentiated by backlighting these keys when in the closed position.

An opening or slit 22 on the right bottom corner may be used for receiving sound such as voice when the device is used for purely telephony based functions. As noted above, the keyboard is considered to be an embodiment of an auxiliary input.

Figure 3:
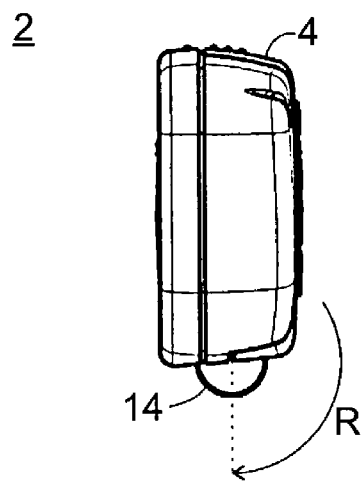
FIG. 3 is a side view of the device of FIG. 1 with the keyboard in the first position.

FIG. 3 illustrates an end view of the device 2. As can be seen, the first housing 4 and the keyboard 16 are on the opposite side of the device 2 from the display 6. The keyboard 16 and the display 6 and are connected by a hinge 14. The keyboard 16 can rotate with respect to display 6 as illustrated by arrow R, so that the keyboard and LCD are in the same plane.

Figure 4:
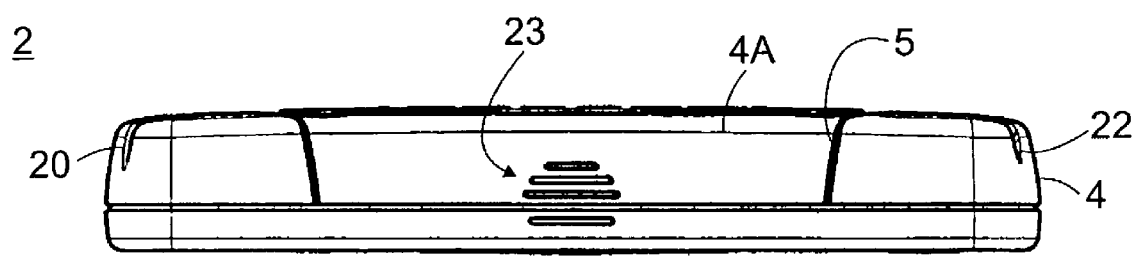
FIG. 4 is a bottom view of the device of FIG. 1 with the keyboard in the first position.

FIG. 4 is a bottom view of the device in the closed position and shows the second housing 4A nested in the recess 5 of the first housing 4. The second housing 4A lies flush with the back of the first housing 4. The second housing may be retained in the recess of the first housing with a locking mechanism such as a detent locking mechanism or the hinge 14 may be spring-loaded to retain the part 4A in position. Other mechanisms to retain the second housing 4A in recess 5 will be well understood by one of skill in the art. In a presently preferred embodiment, at the edge of each housing part 4, 4A, where the housing parts meet in the first position of the keyboard, there are raised stripes 23 to provide gripping surfaces which facilitate pulling the second housing 4A out of the first housing 4 to rotate it into the second, or open, position. These stripes 23 may be made of the same material as the housing, plastic, or rubber.

Figure 5:
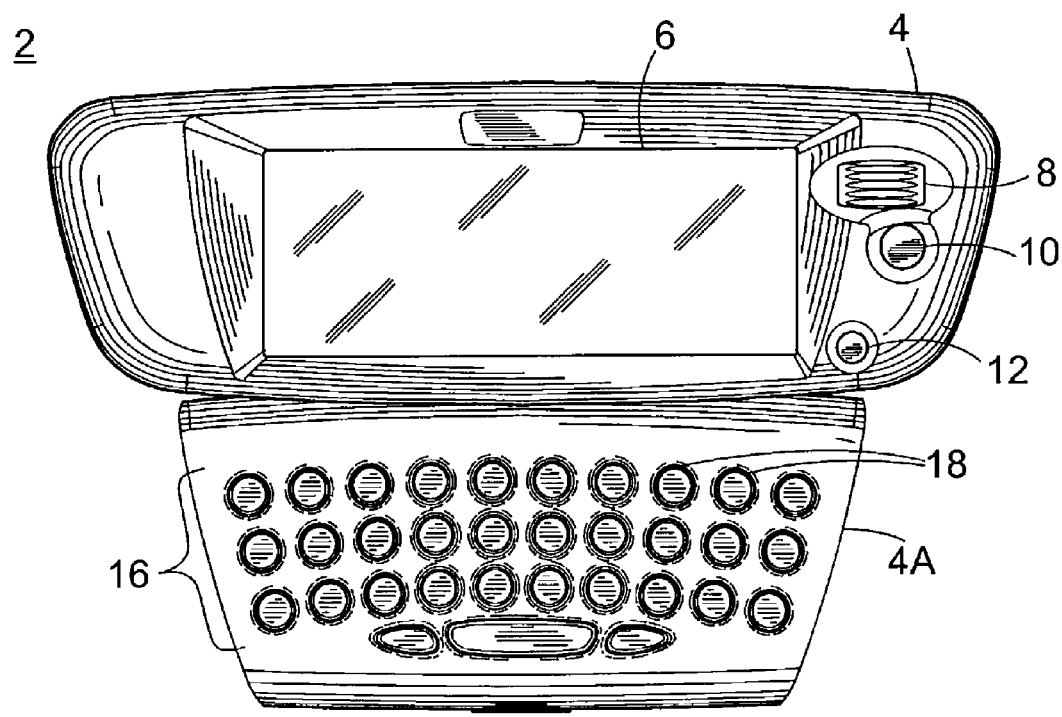
FIG. 5 is a front view of the device of FIG. 1 with the keyboard in the second position.
Figure 6:
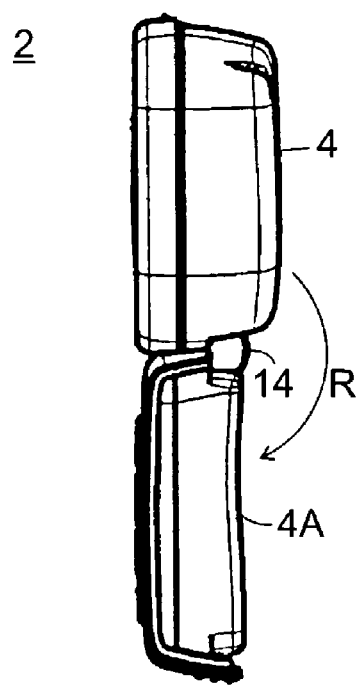
FIG. 6 is a side view of the device of FIG. 1 with the keyboard in the second position.

FIGS. 5 and 6 are respectively front and side views of the device with the keyboard 16 in its second operating position, wherein the second housing 4A and the keyboard 16 have been repositioned so that the second housing 4A is now situated in the same plane as the first housing 4 with the keyboard 16 extending below the first housing 4 and the display 6. In this position, the user may utilize the keyboard 16 while viewing the display 6, and the keyboard 16 may be used for such functions as writing text messages. Thus, in this position, the keyboard 16 is easier to use in conjunction with the display 6 and other auxiliary inputs such as thumbwheel 8 and auxiliary buttons 10 and 12.

As stated above, the housing parts 4 and 4A are held together by a hinge 14 and, as shown in FIGS. 3, 5 and 6, the second housing 4A may be rotated from the first position of the keyboard 16 (FIG. 3) about the axis of the hinge 14 in the direction of the arrow R and locked into the second position of the keyboard 16 (FIGS. 5 and 6). The second housing 4 may lock into the second position through detents or by use of a spring-loaded hinge 14. Naturally, various other locking mechanisms may be substituted for the detents or a spring-loaded hinge.

In a non-illustrated embodiment, the auxiliary input is hingedly attached to the display by a hinge that allows rotation of the keyboard in two dimensions. This allows the keyboard to be rotated from the open position, to an intermediate position where the keys on the auxiliary input face opposite to the display, and then to be rotated into the closed position so that it is flush with the body of the device. This embodiment allows for a device whose auxiliary input is shielded in the closed position. To facilitate this embodiment, the microphone and speaker for the phone can reside first housing 4, and the display can be implemented as a touchscreen LCD so that a user can operate the phone without deploying the auxiliary input. In this embodiment, the user can decide whether or not the auxiliary input should be externally accessible while it is in the closed position by deciding the rotate the second housing 4A prior to putting the keyboard into the closed position. These options, and the increased size of the auxiliary input, provide the user with a more desirable means to input text and data into the device for data driven services.

Figure 7:
FIG. 7 is a back view of the device according to a second embodiment of the invention, with the keyboard in the first position.
Figure 8:
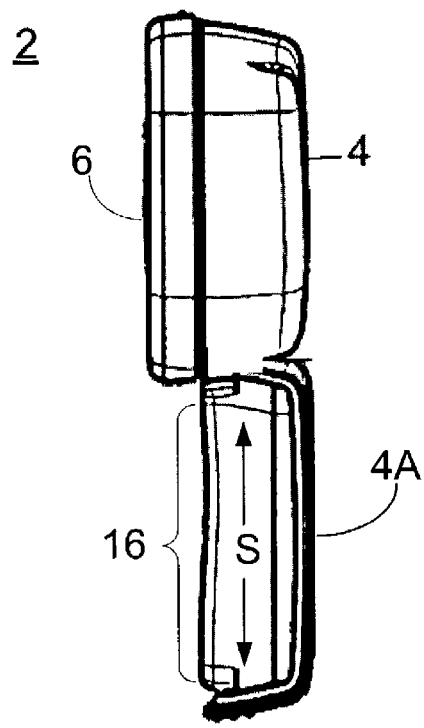
FIG. 8 is a side view of the device of FIG. 7 with the keyboard in the second position.
Figure 9:
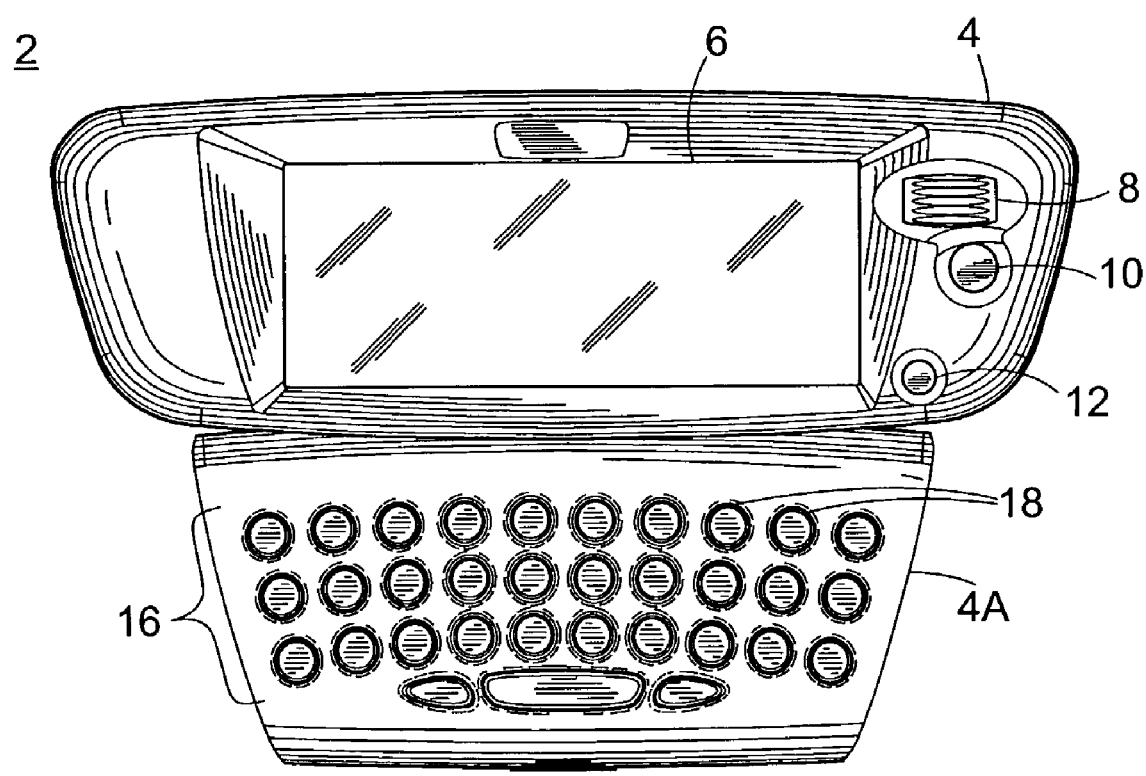
FIG. 9 is a front view of the device of FIG. 7 with the keyboard in the second position.

In an alternative embodiment as shown in FIGS. 7, 8 and 9, the keyboard is hidden from view when the device size is minimized, and inaccessible to the user when in this position. By positioning the part 4A carrying the keyboard 16 behind the display 6, such that the keyboard 16 faces the first housing 4, the keys 18 are hidden by part 4 and can only be accessed if either the display 6 or the second housing 4A is moved to a second position to expose the keyboard 16. This is effected by means of a sliding mechanism, in which the housing parts 4 and 4A are slid apart to expose the keyboard 16. FIG. 7 shows the part 4A in the first position according to this embodiment. FIGS. 8 and 9 show the keyboard in its second position and the arrow S in FIG. 8 shows the direction of sliding movement of the part 4A between these first and second positions. One skilled in the art will appreciate that a number of techniques and arrangement to implement such a sliding mechanism are known in the field. Additionally, the sliding mechanism, as described, prevents access to the keyboard when it is in the closed position. In a preferred embodiment, the sliding mechanism is used in conjunction with a touch screen LCD as display 6 or the inclusion of an additional keypad in the first housing 4. This allows the user to dial without extracting the keyboard. Sliding keyboard embodiments, as illustrated in FIGS. 7-9, are particularly well suited for use with wireless access personal digital assistants (PDAs) whose primary function is not standard telephony.

One of skill in the art will realise that the auxiliary inputs can have many embodiments. In place of, or in addition to, the keyboard or keypad, a thumbwheel, or a pointing device such as a trackball or track pad can be provided as the auxiliary input. Additionally a keyboard can be provided on a touch screen LCD integrated in the auxiliary input. Other such embodiments will be well understood by those skilled in the art, and are within the scope of this disclosure.

The present invention provides a device whose display is always available for viewing, and can be created to be substantially the size of the device. This provides for easy viewing of the presented data. Additionally, it provides a large auxiliary input that can be either accessible or inaccessible while in the closed position. If the embodiments where the auxiliary input is not externally accessible in the closed position are paired with LCD touchscreen displays, then the user is able to operate the device as a phone without moving the auxiliary input into the open position, which greatly simplifies the operation of the device. Use of a touchscreen display also benefits the use of the device as a PDA.

Figure 10:
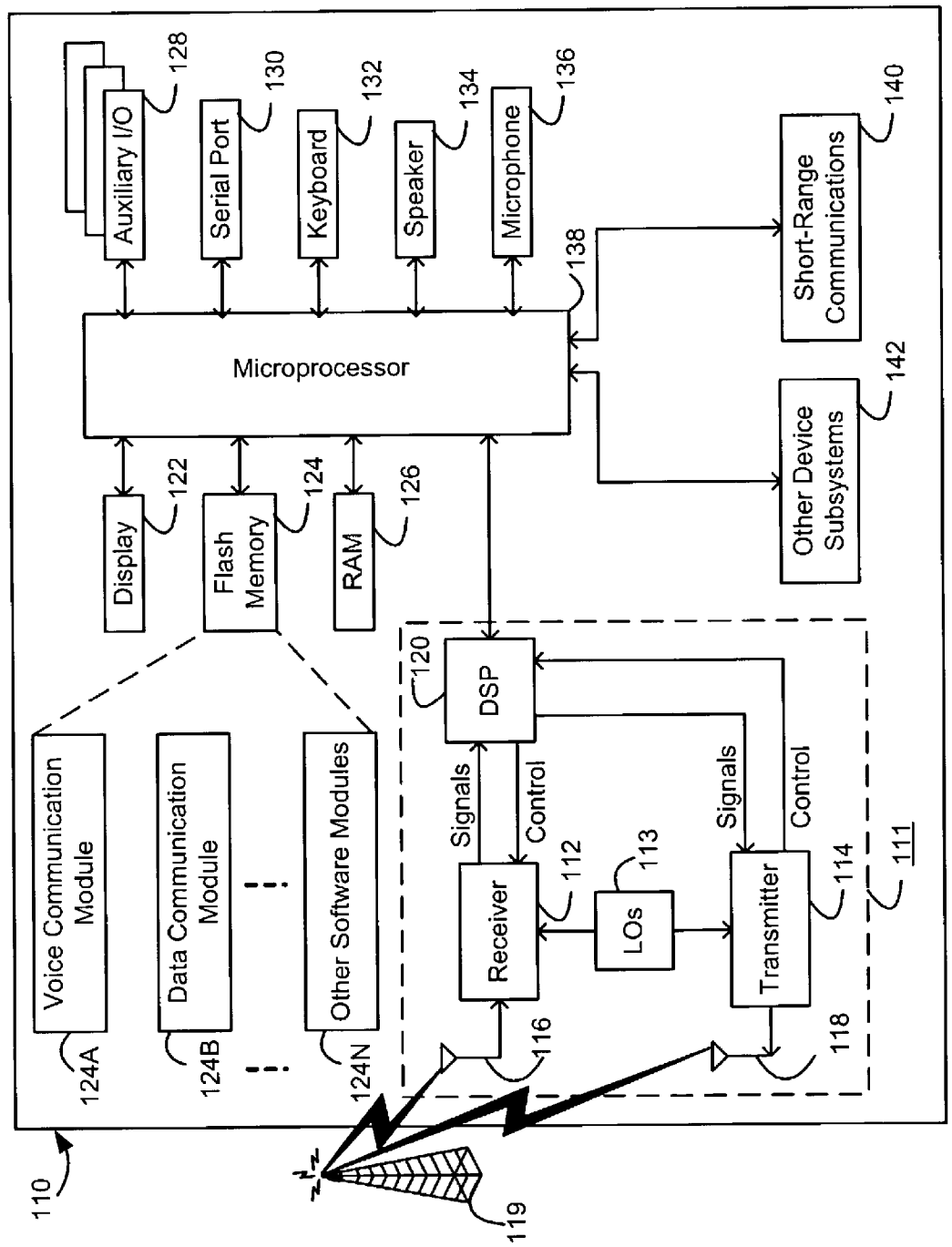
FIG. 10 is a block diagram of a mobile communication device.

FIG. 10 is a block diagram of a mobile communication device 110. The mobile device 110 includes a transceiver 111, a microprocessor 138, a display 122, Flash memory 124, RAM memory 126, auxiliary input/output (I/O) devices 128, a serial port 130, a keyboard 132, a speaker 134, a microphone 136, a short-range wireless communications subsystem 140, and may also include other device sub-systems 142. The transceiver 111 preferably includes transmit and receive antennas 116, 118, a receiver 112, a transmitter 114, one or more local oscillators 113, and a digital signal processor 120. Within the Flash memory 124, the device 110 preferably includes a plurality of software modules 124A-124N that can be executed by the microprocessor 138 (and/or the DSP 120), including a voice communication module 124A, a data communication module 124B, and a plurality of other operational modules 124N for carrying out a plurality of other functions.

The mobile communication device 110 is preferably a two-way communication device having voice and data communication capabilities. Thus, for example, the device may communicate over a voice network, such as any of the analog or digital cellular networks, and may also communicate over a data network. The voice and data networks are depicted in FIG. 10 by the communication tower 119. These voice and data networks may be separate communication networks using separate infrastructure, such as base stations, network controllers, etc., or they may be integrated into a single wireless network.

The communication subsystem 111 is used to communicate with the voice and data network 119, and includes the receiver 112, the transmitter 114, the one or more local oscillators 113 and may also include the DSP 120. The DSP 120 is used to send and receive signals to and from the transmitter 114 and receiver 112, and is also utilized to receive control information from the transmitter 114 and to provide control information to the receiver 112. If the voice and data communications occur at a single frequency, or closely-spaced set of frequencies, then a single local oscillator 113 may be used in conjunction with the transmitter 114 and receiver 112. Alternatively, if different frequencies are utilized for voice communications versus data communications, then a plurality of local oscillators 113 can be used to generate a plurality of frequencies corresponding to the voice and data networks 119. Although two antennas 116, 118 are depicted in FIG. 10, the mobile device 110 could be used with a single antenna structure. Information, which includes both voice and data information, is communicated to and from the communication module 111 via a link between the DSP 120 and the microprocessor 138. The detailed design of the communication subsystem 111, such as frequency band, component selection, power level, etc., will be dependent upon the communication network 119 in which the device is intended to operate. For example, a device 110 intended to operate in a North American market may include a communication subsystem 111 designed to operate with the Mobitex™ or DataTAC™ mobile data communication networks and also designed to operated with any of a variety of voice communication networks, such as AMPS, TDMA, CDMA, PCS, etc., whereas a device 110 intended for use in Europe may be configured to operate with the General Packet Radio Service (GPRS) data communication network and the GSM voice communication network. Other types of data and voice networks, both separate and integrated, may also be utilized with the mobile device 110.

Depending upon the type of network 119 (or networks), the access requirements for the mobile device 110 may also vary. For example, in the Mobitex and DataTAC data networks, mobile devices are registered on the network using a unique identification number associated with each device. In GPRS data networks, however, network access is associated with a subscriber or user of a device 110. A GPRS device typically requires a subscriber identity module ("SIM"), which is required in order to operate the device 110 on a GPRS network. Local or non-network communication functions (if any) may be operable, without the SIM device, but the device 110 will be unable to carry out any functions involving communications over the data network 119, other than any legally required operations, such as 911 emergency calling.

After any required network registration or activation procedures have been completed, the mobile device 110 may the send and receive communication signals, including both voice and data signals, over the network 119 (or networks). Signals received by the antenna 116 from the communication network 119 are routed to the receiver 112, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 120. In a similar manner, signals to be transmitted to the network 119 are processed, including modulation and encoding, for example, by the DSP 120 and are then provided to the transmitter 114 for digital to analog conversion, frequency up conversion, filtering, amplification and transmission to the communication network 119 (or networks) via the antenna 118. Although a single transceiver 111 is shown in FIG. 10 for both voice and data communications, it is possible that the device 110 may include two distinct transceivers, a first transceiver for transmitting and receiving voice signals, and a second transceiver for transmitting and receiving data signals.

In addition to processing the communication signals, the DSP 120 also provides for receiver and transmitter control. For example, the gain levels applied to communication signals in the receiver 112 and transmitter 114 may be adaptively controlled through automatic gain control algorithms implemented in the DSP 120. Other transceiver control algorithms could also be implemented in the DSP 120 in order to provide more sophisticated control of the transceiver 111.

The microprocessor 138 preferably manages and controls the overall operation of the mobile device 110. Many types of microprocessors or microcontrollers could be used here, or, alternatively, a single DSP 120 could be used to carry out the functions of the microprocessor 138. Low-level communication functions, including at least data and voice communications, are performed through the DSP 120 in the transceiver 111. Other, high-level communication applications, such as a voice communication application 124A, and a data communication application 124B may be stored in the Flash memory 124 for execution by the microprocessor 138. For example, the voice communication module 124A may provide a high-level user interface operable to transmit and receive voice calls between the mobile device 110 and a plurality of other voice devices via the network 119. Similarly, the data communication module 124B may provide a high-level user interface operable for sending and receiving data, such as e-mail messages, files, organizer information, short text messages, etc., between the mobile device 110 and a plurality of other data devices via the network 119.

The microprocessor 138 also interacts with other device subsystems, such as the display 122, Flash memory 124, random access memory (RAM) 126, auxiliary input/output (I/O) subsystems 128, serial port 130, keyboard 132, speaker 134, microphone 136, a short-range communications subsystem 140 and any other device subsystems generally designated as 142.

Some of the subsystems shown in FIG. 10 perform communication-related functions, whereas other subsystems may provide "resident" or on-device functions. Notably, some subsystems, such as keyboard 132 and display 122 may be used for both communication-related functions, such as entering a text message for transmission over a data communication network, and device-resident functions such as a calculator or task list or other PDA type functions.

Operating system software used by the microprocessor 138 is preferably stored in a persistent store such as Flash memory 124. In addition to the operation system, which controls all of the low-level functions of the device 110, the Flash memory 124 may include a plurality of high-level software application programs, or modules, such as a voice communication module 124A, a data communication module 124B, an organizer module (not shown), or any other type of software module 124N. The Flash memory 124 also may include a file system for storing data. These modules are executed by the microprocessor 138 and provide a high-level interface between a user of the device and the device. This interface typically includes a graphical component provided through the display 122, and an input/output component provided through the auxiliary I/O 128, keyboard 132, speaker 134, and microphone 136. The operating system, specific device applications or modules, or parts thereof, may be temporarily loaded into a volatile store, such as RAM 126 for faster operation. Moreover, received communication signals may also be temporarily stored to RAM 126, before permanently writing them to a file system located in the persistent store 124.

An exemplary application module 124N that may be loaded onto the mobile device 110 is a personal information manager (PIM) application providing PDA functionality, such as calendar events, appointments, and task items. This module 124N may also interact with the voice communication module 124A for managing phone calls, voice mails, etc., and may also interact with the data communication module for managing e-mail communications and other data transmissions. Alternatively, all of the functionality of the voice communication module 124A and the data communication module 124B may be integrated into the PIM module.

The Flash memory 124 preferably provides a file system to facilitate storage of PIM data items on the device. The PIM application preferably includes the ability to send and receive data items, either by itself, or in conjunction with the voice and data communication modules 124A, 124B, via the wireless network 119. The PIM data items are preferably seamlessly integrated, synchronized and updated, via the wireless network 119, with a corresponding set of data items stored or associated with a host computer system, thereby creating a mirrored system for data items associated with a particular user.

The mobile device 110 may also be manually synchronized with a host system by placing the device 110 in an interface cradle, which couples the serial port 130 of the mobile device 110 to the serial port of the host system. The serial port 130 may also be used to enable a user to set preferences through an external device or software application, or to download other application modules 124N for installation. This wired download path may be used to load an encryption key onto the device, which is a more secure method than exchanging encryption information via the wireless network 119.

Additional application modules 124N may be loaded onto the mobile device 110 through the network 119, through an auxiliary I/O subsystem 128, through the serial port 130, through the short-range communications subsystem 140, or through any other suitable subsystem 142, and installed by a user in the Flash memory 124 or RAM 126. Such flexibility in application installation increases the functionality of the device 110 and may provide enhanced on-device functions, communication-related functions, or both. For example, secure communication applications may enable electronic commerce functions and other such financial transactions to be performed using the device 110.

When the mobile device 110 is operating in a data communication mode, a received signal, such as a text message or a web page download, will be processed by the transceiver 111 and provided to the microprocessor 138, which will preferably further process the received signal for output to the display 122, or, alternatively, to an auxiliary I/O device 128. A user of mobile device 110 may also compose data items, such as email messages, using the keyboard 132, which is preferably a complete alphanumeric keyboard laid out in the QWERTY style, although other styles of complete alphanumeric keyboards such as the known DVORAK style may also be used. User input to the device 110 is further enhanced with a plurality of auxiliary I/O devices 128, which may include a thumbwheel input device, a touchpad, a variety of switches, a rocker input switch, etc. The composed data items input by the user may then be transmitted over the communication network 119 via the transceiver 111.

When the mobile device 110 is operating in a voice communication mode, the overall operation of the device 110 is substantially similar to the data mode, except that received signals are preferably be output to the speaker 134 and voice signals for transmission are generated by a microphone 136. Alternative voice or audio I/O subsystems, such as a voice message recording subsystem, may also be implemented on the device 110. Although voice or audio signal output is preferably accomplished primarily through the speaker 134, the display 122 may also be used to provide an indication of the identity of a calling party, the duration of a voice call, or other voice call related information. For example, the microprocessor 138, in conjunction with the voice communication module and the operating system software, may detect the caller identification information of an incoming voice call and display it on the display 122.

A short-range communications subsystem 140 may also be included in the mobile device 110. For example, the subsystem 140 may include an infrared device and associated circuits and components, or a Bluetooth™ short-range wireless communication module to provide for communication with similarly-enabled systems and devices.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A handheld mobile communication device for transmitting and receiving data, the device comprising:
    a display mounted in a first housing, for displaying information to a user; and
    an auxiliary input mounted in a second housing, for inputting data, the second housing movable in relation to the first housing between a closed position, which situates the auxiliary input behind the display and facing in the opposite direction as the display, and an open position, in which the auxiliary input and the display are positioned to allow simultaneous viewing and input;
    wherein the auxiliary input is further operable for dialing a telephone number in the closed position in which the auxiliary input is behind the display;
    wherein the second housing includes a hinge for hingedly attaching the second housing to the first housing; and
    wherein, in the closed position, the auxiliary input is held in a recess on a back portion of the first housing.

2. The device of claim 1, wherein, in the closed position, the auxiliary input is flush with a rear face of the first housing.

3. The device of claim 1, wherein in the open position, the auxiliary input and the display are substantially in the same plane.

4. The device of claim 1, wherein in the closed position, the auxiliary input is used as a telephone keypad.

5. The device of claim 1, wherein in the open position, the auxiliary input is used for inputting text messages.

6. The device of claim 1, wherein the auxiliary input is a keyboard.

7. The device of claim 1, wherein the display is a liquid crystal display.

8. The device of claim 1, wherein the display is a liquid touchscreen display.

9. The device of claim 1 wherein, in the open position, the auxiliary input and the display are positioned to allow simultaneous viewing of both the display and the auxiliary input while data is input through the auxiliary input for display on the display.

10. The device of claim 1 wherein the auxiliary input is permanently attached to the display by the hinge.

11. A handheld mobile communication device comprising:
    a display mounted in a front face of a first housing, the first housing having a rear surface that is interrupted by a recess; and
    an auxiliary input, for inputting data, mounted in a front face of a second housing, the second housing being movably attached to the first housing for movement between a closed position in which the second housing is situated in the recess behind the first housing and an open position in which the display and the auxiliary input face the same direction for simultaneous viewing and input by a user.

12. The device of claim 11 wherein, in the closed position, a surface of the second housing is flush with, and faces in the same direction as, the rear surface of the first housing.

13. The device of claim 11 wherein, in the closed position, the auxiliary input and the display face opposite directions.

14. The device of claim 11 wherein the second housing is attached to the first housing by a hinge for rotational movement between the closed and open positions.

15. The device of claim 11 wherein the second housing is slidably attached to the first housing for sliding movement between the closed and open positions.

16. The device of claim 11 wherein the device is a portable telephone device, and the auxiliary input is for dialing a telephone number, and the display is for displaying a telephone number.

* * * * *